(12) United States Patent
Düll et al.

(10) Patent No.: US 9,926,853 B2
(45) Date of Patent: Mar. 27, 2018

(54) METHOD FOR THE COMPUTERIZED CONTROL AND/OR REGULATION OF A TECHNICAL SYSTEM

(71) Applicant: SIEMENS AKTIENGESELLSCHAFT, München (DE)

(72) Inventors: Siegmund Düll, München (DE); Alexander Hentschel, München (DE); Steffen Udluft, Eichenau (DE)

(73) Assignee: Siemens Aktiengesellschaft, München (DE)

( * ) Notice: Subject to any disclaimer, the term of this patent is extended or adjusted under 35 U.S.C. 154(b) by 202 days.

(21) Appl. No.: 14/780,538

(22) PCT Filed: Jan. 22, 2014

(86) PCT No.: PCT/EP2014/051187
§ 371 (c)(1),
(2) Date: Sep. 26, 2015

(87) PCT Pub. No.: WO2014/154375
PCT Pub. Date: Oct. 2, 2014

(65) Prior Publication Data
US 2016/0040603 A1    Feb. 11, 2016

(30) Foreign Application Priority Data
Mar. 26, 2013   (DE) .................. 10 2013 205 328

(51) Int. Cl.
*F02C 9/00*      (2006.01)
*G05B 15/02*    (2006.01)
*G05B 13/02*    (2006.01)

(52) U.S. Cl.
CPC .............. *F02C 9/00* (2013.01); *G05B 13/029* (2013.01); *G05B 13/0265* (2013.01)

(58) Field of Classification Search
CPC ...... F02C 9/00; G05B 13/029; G05B 13/0265
See application file for complete search history.

(56) References Cited

U.S. PATENT DOCUMENTS 5,335,291 A * 8/1994 Kramer ............... G06N 3/0472
                                                          382/158
5,485,545 A * 1/1996 Kojima ............... G05B 13/027
                                                          706/23

(Continued)

FOREIGN PATENT DOCUMENTS

DE          60120192 T2      11/2006
DE       102007042440 B3      1/2009

OTHER PUBLICATIONS

Busoniu et al., "Approximate Reinforcement Learning: An Overview," Adaptive Dynamic Programming and Reinforcement Learning, IEEE Conference Proceedings, pp. 1-8, ISBN: 978-1-4244-9887-1, DOI: 10.1109/ADPRL.2011.5967353, XP031907569, 2011.

(Continued)

*Primary Examiner* — Ramesh Patel
(74) *Attorney, Agent, or Firm* — Lempia Summerfield Katz LLC

(57) ABSTRACT

The invention concerns a method for the computerized control and/or regulation of a technical system. Within the context of the method according to the invention, an action-selection rule (PO') is determined which has a low level of complexity and yet is well suited to the regulating and/or control of the technical system, there being used for determination of the action-selection rule (PO') an evaluation measure (EM) which is determined on the basis of a distance measure and/or a reward measure and/or an action-selection rule evaluation method. The action-selection rule is then used to control and/or regulate the technical system. The method according to the invention has the advantage of the (Continued)

action-selection rule being comprehensible to a human expert. Preferably, the method according to the invention is used for regulating and/or controlling a gas turbine and/or a wind turbine.

19 Claims, 1 Drawing Sheet

(56) References Cited

U.S. PATENT DOCUMENTS

| | | | | |
|---|---|---|---|---|
| 6,952,688 | B1* | 10/2005 | Goldman | G06N 5/022 706/45 |
| 7,660,636 | B2* | 2/2010 | Castel | A61N 1/36014 607/118 |
| 8,447,706 | B2 | 5/2013 | Schneega et al. | |
| 2003/0100974 | A1 | 5/2003 | Alvarez et al. | |
| 2004/0187599 | A1* | 9/2004 | Drahm | G01F 1/8409 73/861.357 |
| 2004/0193068 | A1* | 9/2004 | Burton | A61B 5/0476 600/544 |
| 2005/0149234 | A1* | 7/2005 | Vian | G05B 23/024 700/279 |
| 2006/0047482 | A1* | 3/2006 | Yuan | G06F 11/0736 702/185 |
| 2009/0070047 | A1* | 3/2009 | Swanson | G05B 17/02 702/32 |
| 2009/0099985 | A1 | 4/2009 | Tesauro et al. | |
| 2010/0049340 | A1 | 2/2010 | Smits et al. | |
| 2010/0205974 | A1 | 8/2010 | Schneegass et al. | |
| 2010/0257866 | A1* | 10/2010 | Schneegass | G05B 13/027 60/773 |
| 2011/0135166 | A1* | 6/2011 | Wechsler | G06K 9/00288 382/118 |
| 2011/0172504 | A1* | 7/2011 | Wegerich | A61B 5/0205 600/301 |
| 2012/0072029 | A1* | 3/2012 | Persaud | G06N 5/04 700/276 |
| 2013/0013543 | A1* | 1/2013 | Dull | G05B 13/027 706/25 |
| 2014/0201126 | A1* | 7/2014 | Zadeh | G06K 9/627 706/52 |
| 2015/0032752 | A1* | 1/2015 | Greifeneder | G06F 17/30598 707/738 |
| 2015/0112904 | A1* | 4/2015 | Gauthier | G06N 7/00 706/13 |
| 2015/0112905 | A1* | 4/2015 | Miner | G06N 7/00 706/13 |
| 2015/0112906 | A1* | 4/2015 | Gauthier | G06N 7/00 706/13 |

OTHER PUBLICATIONS

Föllinger et al., "Regelungstechnik, Einfuhrung in die Methoden and ihre Anwendung", Hüthig Verlag Heidelberg, 10. Auflage, ISBN 978-3-7785-2970-6, 2008.
German Office Action for related German Application No. 10 2013 205 328.2, dated Nov. 26, 2013, with English Translation.
PCT International Search Report and Written Opinion of the International Searching Authority dated May 28, 2014 for corresponding Application No. PCT/EP2014/051187 with English Translation.
Schneegass et al.,"Improving Optimality of neural rewards Regression for Data-Efficient Batch Near-Optimal Policy Identification" Artificial Neural Networks â ICANN 2007, (Lecture notes in computer science), Springer Berlin Heidelberg, Berlin, Heidelberg, Bd. 4668; pp. 109-118, ISBN: 978-3-540-74689-8 XP019069348, 2007.
Silva et al; "Measuring Bloat, Overtitting and Functional Complexity in Genetic Pro-gramming," Proceedings of the 12th annual conference on Genetic and evolutionary computation, pp. 877-884, ACM New York, NY, 2010.
Vanneschi et al., "Measuring Bloat, Overfitting and Functional Complexity in Genetic Programming," GECCO, pp. 877-884, 2010.

* cited by examiner

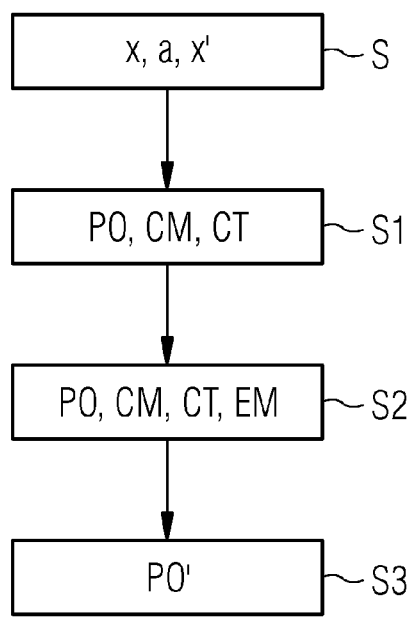

METHOD FOR THE COMPUTERIZED CONTROL AND/OR REGULATION OF A TECHNICAL SYSTEM

This application is the National Stage of International Application No. PCT/EP2014/051187, filed Jan. 22, 2014, which claims the benefit of German Patent Application No. 10 2013 205 328.2, filed Mar. 26, 2013. The entire contents of these documents are hereby incorporated herein by reference.

The present embodiments relate to the computerized control and/or regulation of a technical system.

Complex technical systems (e.g., gas turbines or wind turbines) are often regulated based on computerized methods that establish an action selection policy based on training data and corresponding optimality criteria. This action selection policy specifies which action is to be carried out on the technical system in a corresponding state of the system. In this way, for example, operation of the technical system having a high efficiency may be achieved. For gas turbines, the combustion chamber dynamics or the emissions may optionally be reduced. In the case of wind turbines, for example, the alignment of the gondola in relation to the wind may also be optimized.

To determine corresponding action selection policies for technical systems, complex regression methods(e.g., neuronal networks) are usually used. However, these have the disadvantage that the complex regression methods generate complex action selection policies that may no longer be interpreted or understood by human experts. Accordingly, complex action selection policies are not used in the operation of a technical system because of a lack of comprehensibility. Methods are known from the prior art, using which action selection policies having lower complexity are generated, for example, in that the technical system is represented by states having smaller dimension or simpler regression methods are used. However, these approaches frequently result in an action selection policy that is not optimum for the control or regulation of the technical system.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a method for the computerized control and/or regulation of a technical system, which uses an action selection policy having lower complexity and is well suited for the technical system, is provided.

The method according to one or more of the present embodiments will be explained hereafter based on acts a) to c). The identification of these acts is only used for better referencing of the features contained therein and does not establish a sequence of the execution. For example, specific acts may also be carried out in parallel or may be interwoven.

The method according to one or more of the present embodiments is used for the computerized control or regulation of a technical system. According to act a), the dynamic behavior of the technical system is characterized for multiple points in time in each case by a state of the technical system and an action executed on the technical system, where a respective action at a respective point in time results in a new state of the technical system at the next point in time. The concept of the state or the action is to be understood broadly in this case. A state may include, for example, a state vector having one or more state variables. A state at the respective (e.g., present) point in time may optionally include, in addition to a state vector for the present point in time, one or more state vectors for one or more preceding points in time, whereby the history of the state over a restricted time horizon is taken into consideration. An action may also represent a vector of multiple action variables.

In act b) of the method according one or more of the present embodiments, action selection policies (e.g., multiple action selection policies) are provided and/or generated, where a respective action selection policy specifies an action to be executed at a corresponding point in time on the technical system in dependence on at least the state of the technical system at the corresponding point in time. Each action selection policy is associated with a complexity measure that describes a complexity of the respective action selection policy that is less than or equal to a predetermined complexity threshold. The complexity measure may be defined in this case in various ways, where examples of such complexity measures are provided hereafter.

In act c) of the method according to one or more of the present embodiments, the action selection policy having the highest evaluation measure of the provided and/or generated action selection policies is ascertained from the provided and/or generated action selection policies by the calculation of evaluation measures that each describe the suitability of an action selection policy for the regulation and/or control of the technical system. A higher evaluation measure describes in this case a better suitability of the action selection policy for the regulation and/or control of the technical system. In specific embodiments, acts b) and c) may be carried out in parallel or may be interwoven. For example, firstly specific action selection policies may be generated, and subsequently, a part of the action selection policies having poor evaluation measures may be discarded. Subsequently, new action selection policies are in turn generated, and in the same manner, corresponding action selection policies are again discarded. For example, in the case of the use of the genetic programming or particle swarm optimization described hereafter, acts b) and c) are interwoven.

The evaluation measure, which is calculated in the scope of act c), of a respective action selection policy may be dependent according to one or more of the present embodiments on one or more of the following three variables:
- a distance measure between the respective action selection policy and a predefined optimum action selection policy, where decreasing distance measures represent higher evaluation measures and wherein the predefined optimum action selection policy may be based on a neuronal network (e.g., a recurrent neuronal network);
- a reward measure that results upon the execution of the respective action selection policy in a simulation of the technical system, where higher reward measures result in higher evaluation measures and wherein the simulation may be based on a neuronal network (e.g., a recurrent neuronal network);
- a quality measure for the respective action selection policy, which is determined by an action selection policy evaluation method, wherein higher quality measures result in higher evaluation measures.

The above-described reward measure is established in dependence on predetermined optimality criteria of the operation of the technical system, where a higher reward measure establishes a better control or regulation of the technical system in consideration of the optimality criteria. The determination of a quality measure based on an action selection policy evaluation method is known per se from the prior art. For example, various types of action selection policy evaluation methods are known. In one embodiment, a "fitted policy evaluation method" is used (see document [1]).

After determination of the action selection policy in act c), the technical system is finally regulated and/or controlled using this action selection policy in act d).

The method according to one or more of the present embodiments enables the regulation or control of a technical system using an action selection policy having lesser complexity, which provides the most optimum possible operation of the technical system by establishing a suitable evaluation measure. By reducing the complexity of the action selection policy, it is more easily comprehensible by a human, so that the computerized control or regulation of the technical system using this action selection policy is more accepted.

In one embodiment, the provided or generated action selection policies are each represented by a functional relationship, which supplies the action to be executed at the respective point in time based on at least the state of the technical system at the respective point in time. The concept of the functional relationship is to be understood broadly in this case and may include any arbitrary type of function or function composition or mathematical expression. For example, the functional relationship may include settable parameters, where an action selection policy is defined by establishing corresponding parameter values.

The complexity measure used in the method according to one or more of the present embodiments may be defined in various ways. Various methods for determining complexity measures are known in this case from the prior art (see, for example, document [2]). In one embodiment, the complexity measure is represented by a description length of the functional relationship, where the complexity according to the complexity measure is less the shorter the description length is. In an embodiment, the description length includes the length of a binary or ASCII representation of the functional relationship and/or the number of nodes in the parsing tree represented by the functional relationship and/or the number of settable parameters of the functional relationship. In this case, the complexity according to the complexity measure is less the shorter the length of the binary or ASCII representation of the functional relationship is or the smaller the number of nodes in the parsing tree is or the smaller the number of the settable parameters is. The length of the binary or ASCII representation is represented in this case by the length of the corresponding binary code or ASCII code. The preparation of a parsing tree from a functional relationship is known per se from the prior art and therefore will not be explained in greater detail.

In a further variant of the method, the action selection policies provided in act b) are based on expert knowledge. In other words, the action selection policies are predefined by experts. These action selection policies are stored in a memory and are read out in act b) of the method.

In a further variant of the method according to one or more of the present embodiments, acts b) and c) are carried out by genetic programming and/or based on particle swarm optimization. In these methods, new action selection policies are generated and added to a population step-by-step, where action selection policies having a poor evaluation measure are discarded from the population again. Methods for genetic programming or particle swarm optimization are well known from the prior art and therefore will not be described in greater detail here.

In a further embodiment of the method, the generation of the action selection policies in act b) is performed such that the action selection policies are derived from a predetermined optimum action selection policy. The predetermined optimum action selection policy may correspond in this case to the predefined optimum action selection policy from act c) of the method according to the present embodiments. The predetermined optimum action selection policy generally has a complexity measure, the complexity of which is substantially higher than the predetermined complexity threshold. The derivation of the action selection policies may be performed by an approximation of the predetermined optimum action selection policy by a functional relationship that represents a complexity measure having a complexity that is less than or equal to the predetermined complexity threshold.

In a further variant of the method, the distance measure in act c) is determined such that one or more actions are generated from the predefined optimum action selection policy and one or more actions are generated from the respective action selection policy and the deviation between the action or actions that are generated from the optimum action selection policy, and the action or actions that are generated from the respective action selection policy is determined. A greater deviation represents a greater distance measure in this case and therefore a lesser evaluation measure. The deviation may be, for example, a square deviation.

The method according to one or more of the present embodiments is suitable, for example, for the regulation and/or control of a technical system in the form of a gas turbine and/or wind turbine.

In the case of a gas turbine, the states of the gas turbine may include one or more of the following variables:

the temperature and/or the pressure at one or more points on the gas turbine (e.g., the ambient temperature and/or the ambient pressure and/or the compressor temperature and/or the compressor pressure and/or the temperature in the combustion chamber and/or the pressure in the combustion chamber);

the air humidity at one or more points on the gas turbine;

combustion chamber accelerations in the gas turbine;

the pollutant emission of the gas turbine (e.g., the nitrogen oxide emission);

the power generated by the gas turbine.

In contrast, the actions to be executed on the gas turbine may include a change of the setting of one or more fuel injection valves and/or a change of the position of one or more blades of the gas turbine (e.g., the inlet blades).

In the case that the technical system is a wind turbine, the states of the wind turbine may include one or more of the following variables:

the temperature and/or the pressure and/or the air humidity at one or more points on the wind turbine (e.g., the ambient temperature and/or the ambient pressure and/or the ambient air humidity);

the wind strength at the wind turbine;

the power generated by the wind turbine.

In contrast, the actions to be executed on the wind turbine may include a change of the attack angle of the rotor blades of the rotor of the wind turbine and/or a change of the alignment of the rotor of the wind turbine in relation to the wind.

In addition to the above-described method, the present embodiments relate to a computer program product having a program that is stored on a machine-readable carrier, for carrying out the method according to one or more of the present embodiments, or one or more variants of the method when the program runs on a computer.

BRIEF DESCRIPTION OF THE DRAWINGS

FIG. 1. shows a schematic illustration of the sequence of a variant of a method.

DETAILED DESCRIPTION

The embodiment described hereafter enables the determination of an action selection policy for the control or regulation of a technical system that has a low complexity and may therefore be understood by the operator of the technical system or a human expert. The action selection policy also has a high evaluation measure that represents the suitability of an action selection policy for the regulation or control of the technical system. As already described above, the method is suitable, for example, for the regulation and/or control of a gas turbine or a wind turbine.

The starting point of the method of FIG. 1, which is identified with reference sign S (S=start), is a characterization of the dynamic behavior of the technical system to be controlled or regulated via a state x at a corresponding point in time and also an action a carried out at this point in time, which results in a following state x'. This state may be a state vector having a variety of state variables in this case. An action may also be represented by a vector having multiple action variables.

In act S1 of the method of FIG. 1, a variety of action selection policies PO are provided, with each of which a complexity measure CM is associated, which is less than a predefined complexity threshold CT. In the variant described, the action selection policies are predefined by an expert and are represented in this case by a function having a predetermined number of free (e.g., settable) parameters. The number of parameters determines the complexity measure CM. The number of the free parameters is selected to be sufficiently small in this case that a complexity measure results therefrom, which is less than the complexity threshold CT.

In act S2, further action selection policies PO are generated by particle swarm optimization (PSO) from the provided action selection policies of act S1. In this case, new action selection policies, which are added to the population of the action selection policies, are generated by changing the free parameters. The new action selection policies are subsequently evaluated based on an evaluation measure EM. A higher evaluation measure represents a better suitability of an action selection policy for the regulation or control of the technical system. Since only the free parameters in the action selection policy predefined by the expert are optimized, it is provided that all new action selection policies have a complexity measure CM that is less than the complexity threshold CT. In the scope of the particle swarm optimization, action selection policies having low evaluation measures are discarded and new action selection policies are added to the population again and again step-by-step, until finally, based on an abort criterion, the action selection policy PO' that has the highest evaluation measure is determined from the population.

Acts S1 and S2, as described above, may be summarized as follows:

An expert determines an action selection policy (function) having free parameters. Example: x is the state variable of the system. The expert thinks that an optimum action selection policy (a is action) is described by the following formula:

$$a = \sin(k*x) - g*x^2,$$

where k and g are free parameters.

PSO searches based on the evaluation measures for the best (numeric) values for these free parameters.

Example: PSO finds k=2.704 and g=−0.629 as optimal.

The action selection policy having the parameter values found by the PSO as optimal becomes the action selection policy PO' (for the above example, thus $a = \sin(2.704*x) + 0.629*x^2$.

The ascertained action selection policy PO' is finally used in act S3 for the regulation or control of the technical system. In other words, based on the present state and optionally additional previous states of the technical system, the action that is executed at the present point in time on the technical system is determined by the action selection policy PO'.

The evaluation measure EM, which is calculated in act S2, may be ascertained in various ways. In one variant, the evaluation measure represents the above-described distance measure between a respective action selection policy and a predefined optimum action selection policy. The evaluation measure may also represent the above-described reward measure or the above-described quality measure or combinations of the distance measure, the reward measure, and the quality measure. Instead of a particle swarm optimization, other methods for ascertaining the action selection policy PO' may also be used in act S2 of the above-described method. For example, genetic programming, which is known per se, may be used.

A variant of acts S1 and S2 for ascertaining an action selection policy by genetic programming will be explained hereafter.

In act S1, functional building blocks (e.g., sin(x), exp(x)) are predefined by an expert, where x represents the state of the technical system having corresponding state variables. By randomly joining together the functional building blocks to form valid mathematical formulae based on the state variables, initial action selection policies PO are generated. The generation process provides in this case that only action selection policies are generated, the complexity measure of which does not exceed the complexity threshold CT. From the provided action selection policies of act S1, further action selection policies PO are determined in act S2 by genetic programming. In this case, new action selection policies that are added to the population of the action selection policies are generated. The new action selection policies are subsequently evaluated based on an evaluation measure EM. A higher evaluation measure represents a better suitability of an action selection policy for regulating or controlling the technical system in this case. Via the genetic programming, it is provided that all new action selection policies have a complexity measure CM that is less than the complexity threshold CT. In the scope of the genetic programming, action selection policies having low evaluation measures are discarded and new action selection policies are added to the population again and again step-by-step, until finally, based on an abort criterion, the action selection policy PO' is determined from the population that has the highest evaluation measure.

Acts S1 and S2, as explained above, may be summarized as follows:

An expert determines functional building blocks for action selection policies having free parameters.

Example: The expert defines that in an action selection policy for the action a, the following mathematical building blocks may be used:
multiplication, addition, subtraction,
sine, cosine,
state variable x,
numeric constants (e.g., arbitrary fixed numbers).

The genetic programming attempts to assemble formulae, which have the highest possible evaluation measure and do not exceed the predefined complexity measure, for action selection policies from the mathematical building blocks.

Example: The genetic programming ascertains that the following action selection policy is best:

$$a=\sin(2.704*x)+0.629*x*x.$$

This action selection policy then becomes the action selection policy PO'.

The embodiment described above has an array of advantages. For example, a regulation or control of a technical system using an action selection policy having lower complexity is achieved. The action selection policy is therefore comprehensible by the operator of the technical system or a human expert and results in a higher acceptance of the regulation or control of the technical system carried out by the action selection policy. It is also provided that the action selection policy is very well suited for the control or regulation of the technical system in spite of its low complexity.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

while the present invention has been described above by reference to various embodiments, it should be understood that many changes and modificatons can be made to the described embodiments, It is therefore intended that the foregoing description be regarded as illustrative rather than limiting, and that it be understood that all equivalents and/or combinations of the embodiments are intended to be included in this description.

Bibliography

[1] L. Busoniu, D. Ernst, B. De Schutter, R. Babuška, "Approximate Reinforcement Learning: An Overview", Adaptive Dynamic Programming And Reinforcement Learning, IEEE Conference Proceedings, 2011

[2] S. Silva, M. Castelli, L. Vanneschi, "Measuring Bloat, Overfitting and Functional Complexity in Genetic Programming", Proceedings of the 12th annual conference on Genetic and evolutionary computation, pages 877-884, ACM New York, N.Y., 2010

The invention claimed is:

1. A method for computerized control, regulation, or control and regulation of a technical system, the method comprising:
characterizing, by a processor, a dynamic behavior of the technical system for multiple points in time in each case by a state of the technical system and an action executed on the technical system, wherein a respective action at a respective point in time results in a new state of the technical system at the next point in time;
providing, generating, or providing and generating action selection policies, by the processor, wherein a respective action selection policy specifies an action to be executed at a corresponding point in time on the technical system, in dependence on at least the state of the technical system at the corresponding point in time, and wherein each action selection policy is associated with a complexity measure that describes a complexity of the respective action selection policy that is less than or equal to a predetermined complexity threshold;
ascertaining, by the processor, the action selection policy having the highest evaluation measure of the provided, generated, or provided and generated action selection policies from the provided, generated, or provided and generated action selection policies by the calculation of evaluation measures, each of the evaluation measures describing the suitability of an action selection policy for the regulation, control, or regulation and control of the technical system, wherein a higher evaluation measure describes a better suitability of the action selection policy for the regulation, control, or regulation and control of the technical system, and wherein the evaluation measure of a respective action selection policy is dependent on:
a distance measure between the respective action selection policy and a predefined optimum action selection policy, wherein decreasing distance measures represent higher evaluation measures;
a reward measure that results upon the execution of the respective action selection policy in a simulation of the technical system, wherein higher reward measures result in higher evaluation measures;
a quality measure for the respective action selection policy, which is determined by an action selection policy evaluation method, wherein higher quality measures result in higher evaluation measures; or
any combination thereof;
regulating, controlling, or regulating and controlling, by the processor, the technical system based on the ascertained action selection policy.

2. The method of claim 1, wherein the provided, generated, or provided and generated action selection policies are represented by a functional relationship that supplies the action to be executed at the respective point in time based on at least the state of the technical system at the respective point in time.

3. The method of claim 2, wherein the complexity measure is represented by a description length of the functional relationship,
wherein the complexity according to the complexity measure is less the shorter the description length is,
wherein the description length comprises a length of a binary or ASCII representation of the functional relationship, a number of nodes in a parsing tree represented by the functional relationship, the number of settable parameters of the functional relationship, or any combination thereof, and
wherein the complexity according to the complexity measure is less the shorter the length of the binary or ASCII representation of the functional relationship is, the smaller the number of nodes in the parsing tree is, or the smaller the number of the settable parameters is.

4. The method of claim 1, wherein the action selection policies provided in the providing are based on expert knowledge.

5. The method of claim 1, wherein the providing and the ascertaining are carried out by genetic programming, are based on particle swarm optimization, or a combination thereof.

6. The method of claim 1, wherein the action selection policies are generated, and
wherein generating the action selection policies comprises generating the action selection policies such that the action selection policies are derived from a predetermined optimum action selection policy.

7. The method of claim 6, wherein the derivation of the action selection policies is performed by an approximation of the predetermined optimum action selection policy using a functional relationship that represents a complexity measure having a complexity that is less than or equal to the predetermined complexity threshold.

8. The method of claim 1, wherein the distance measure is determined such that one or more actions are generated from the predefined optimum action selection policy and one or more actions are generated from the respective action selection policy, and the deviation between the action or actions that are generated from the optimum action selection policy and the action or actions that are generated from the respective action selection policy is determined, and
wherein a greater deviation represents a greater distance measure.

9. The method of claim 1, wherein the simulation of the technical system the ascertaining is based on a neuronal network.

10. The method of claim 1, wherein a fitted policy evaluation method is used as the action selection policy evaluation method.

11. The method of claim 1, wherein the technical system comprises a gas turbine, a wind turbine, or the gas turbine and the wind turbine.

12. The method of claim 11, wherein the technical system comprises the gas turbine, or the gas turbine and the wind turbine, and
wherein the states of the gas turbine comprise one or more variables, the one or more variables comprising:
a temperature, a pressure, or the temperature and the pressure at one or more points on the gas turbine;
an air humidity at one or more points on the gas turbine;
combustion chamber accelerations in the gas turbine;
a pollutant emission of the gas turbine;
a power generated by the gas turbine; or
any combination thereof.

13. The method of claim 12, wherein the actions to be executed on the gas turbine comprise a change of a setting of one or more fuel injection valves, a change of a position of one or more blades in the gas turbine, or a combination thereof.

14. The method of claim 11, wherein the technical system comprises the wind turbine, or the gas turbine and the wind turbine, and
wherein the states of the wind turbine comprise one or more variables, the one or more variables comprising:
a temperature, a pressure, an air humidity, or any combination thereof at one or more points on the wind turbine;
a wind strength at the wind turbine;
a power generated by the wind turbine; or
any combination thereof.

15. The method of claim 14, wherein the actions to be executed on the wind turbine comprise a change of an attack angle of the rotor blades of a rotor of the wind turbine, a change of an alignment of a rotor of the wind turbine in relation to the wind, or a combination thereof.

16. The method of claim 12, wherein the temperature, the pressure, or the temperature and the pressure at the one or more points on the gas turbine comprise an ambient temperature, an ambient pressure, a compressor temperature, a compressor pressure, a temperature in a combustion chamber, a pressure in the combustion chamber, or any combination thereof.

17. The method of claim 12, wherein the pollutant emission of the gas turbine comprises a nitrogen oxide emission.

18. The method of claim 14, wherein the temperature, the pressure, the air humidity, or any combination thereof at the one or more points on the wind turbine comprises an ambient temperature, an ambient pressure, an ambient air humidity, or any combination thereof.

19. A computer program product having a program, with instructions that are stored on a non-transitory machine-readable carrier for computerized control, regulation, or control and regulation of a technical system when the program runs on a computer, the instructions comprising:
characterizing a dynamic behavior of the technical system for multiple points in time in each case by a state of the technical system and an action executed on the technical system, wherein a respective action at a respective point in time results in a new state of the technical system at the next point in time;
providing, generating, or providing and generating action selection policies, wherein a respective action selection policy specifies an action to be executed at a corresponding point in time on the technical system, in dependence on at least the state of the technical system at the corresponding point in time, and wherein each action selection policy is associated with a complexity measure that describes a complexity of the respective action selection policy that is less than or equal to a predetermined complexity threshold;
ascertaining the action selection policy having the highest evaluation measure of the provided, generated, or provided and generated action selection policies from the provided, generated, or provided and generated action selection policies by the calculation of evaluation measures, each of the evaluation measures describing the suitability of an action selection policy for the regulation, control, or regulation and control of the technical system, wherein a higher evaluation measure describes a better suitability of the action selection policy for the regulation, control, or regulation and control of the technical system, and wherein the evaluation measure of a respective action selection policy is dependent on:
a distance measure between the respective action selection policy and a predefined optimum action selection policy, wherein decreasing distance measures represent higher evaluation measures;
a reward measure that results upon the execution of the respective action selection policy in a simulation of the technical system, wherein higher reward measures result in higher evaluation measures;
a quality measure for the respective action selection policy, which is determined by an action selection policy evaluation method, wherein higher quality measures result in higher evaluation measures; or
any combination thereof;
regulating, controlling, or regulating and controlling the technical system based on the ascertained action selection policy.

* * * * *